(12) United States Patent
Saculles

(10) Patent No.: US 10,519,991 B2
(45) Date of Patent: Dec. 31, 2019

(54) UNIVERSAL MOUNTING APPARATUS FOR MOBILE ELECTRONIC DEVICES

(71) Applicant: James Cimafranca Saculles, Boise, ID (US)

(72) Inventor: James Cimafranca Saculles, Boise, ID (US)

(73) Assignee: TIMBERLINE TOOLING, INC., Boise, ID (US)

( * ) Notice: Subject to any disclaimer, the term of this patent is extended or adjusted under 35 U.S.C. 154(b) by 0 days.

(21) Appl. No.: 15/983,022

(22) Filed: May 17, 2018

(65) Prior Publication Data

US 2019/0353189 A1 Nov. 21, 2019

(51) Int. Cl.
| | |
|---|---|
| *F16B 2/12* | (2006.01) |
| *F16M 13/04* | (2006.01) |
| *F16M 11/04* | (2006.01) |
| *B62J 11/00* | (2006.01) |

(52) U.S. Cl.
CPC ............... *F16B 2/12* (2013.01); *F16M 11/04* (2013.01); *F16M 13/04* (2013.01); *B62J 11/00* (2013.01)

(58) Field of Classification Search
CPC ..... F16B 2/12; F16B 2/06; F16B 2/04; F16M 11/04; F16M 13/04; F16M 11/041; F16M 2200/022; B62J 11/00; H04M 1/04
USPC ...................................................... 248/316.4
See application file for complete search history.

(56) References Cited

U.S. PATENT DOCUMENTS

| | | | | |
|---|---|---|---|---|
| 8,240,628 | B2 * | 8/2012 | Huang ................. | F16M 11/041 248/122.1 |
| 9,820,567 | B1 * | 11/2017 | Zaloom .................. | F16M 11/12 |
| 10,208,777 | B1 * | 2/2019 | Brassard ............. | E05B 73/0082 |
| 2007/0022582 | A1 * | 2/2007 | Carnevali ................. | A45F 5/00 24/523 |
| 2008/0207279 | A1 * | 8/2008 | Piekarz ............... | B60R 11/0241 455/575.1 |
| 2010/0237210 | A1 * | 9/2010 | Anderson .............. | F16M 11/04 248/274.1 |
| 2012/0037783 | A1 * | 2/2012 | Alexander ............. | A47F 7/024 248/551 |
| 2012/0257346 | A1 * | 10/2012 | Hulet ...................... | H04M 1/04 361/679.32 |
| 2012/0273637 | A1 * | 11/2012 | Huang ................. | F16M 11/041 248/291.1 |
| 2013/0134267 | A1 * | 5/2013 | Liu ........................ | F16M 11/10 248/122.1 |

(Continued)

*Primary Examiner* — Christopher Garft
(74) *Attorney, Agent, or Firm* — Cotman IP Law Group

(57) ABSTRACT

A universal phone mounting apparatus is presented. The invention includes an elongate main body with an opening each end for access to a first and second axial cavities inside the main body. A first clamp with a first main rail slidably coupled in the first axial cavity through the first opening and a second clamp with a second main rail slidably coupled in the second axial cavity through the second opening. A compression spring may be located in either or both of the first and second cavities. On the side of the main body is a first port for selectively applying compressive force to the first main rail thereby restricting its movement, and a second port for selectively applying compressive force to the second main rail thereby restricting its movement. The main body further includes a channel on a bottom side for securely coupling an external mounting adapter.

20 Claims, 18 Drawing Sheets

(56) References Cited

U.S. PATENT DOCUMENTS

| | | | |
|---|---|---|---|
| 2014/0145050 A1* | 5/2014 | Hung | F16M 11/041 248/274.1 |
| 2015/0313026 A1* | 10/2015 | Yu | G06F 1/1626 248/285.1 |
| 2015/0355531 A1* | 12/2015 | Ben Yehuda | F16M 11/041 396/425 |
| 2017/0001576 A1* | 1/2017 | Jonik et al. | B60R 11/0241 |
| 2017/0049251 A1* | 2/2017 | Gulick, Jr. | A47F 7/0246 |
| 2018/0001950 A1* | 1/2018 | Allen | B62J 9/003 |

* cited by examiner

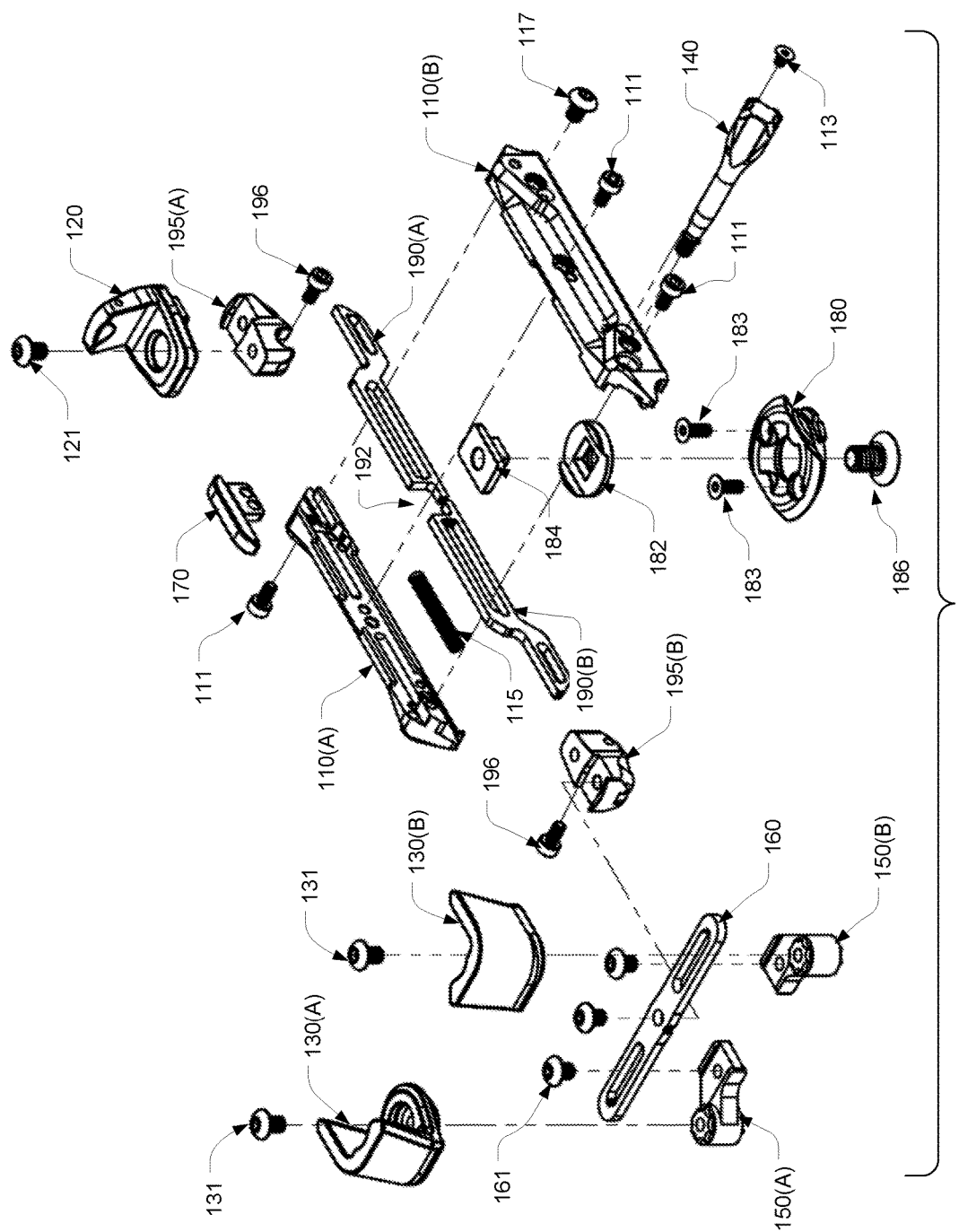

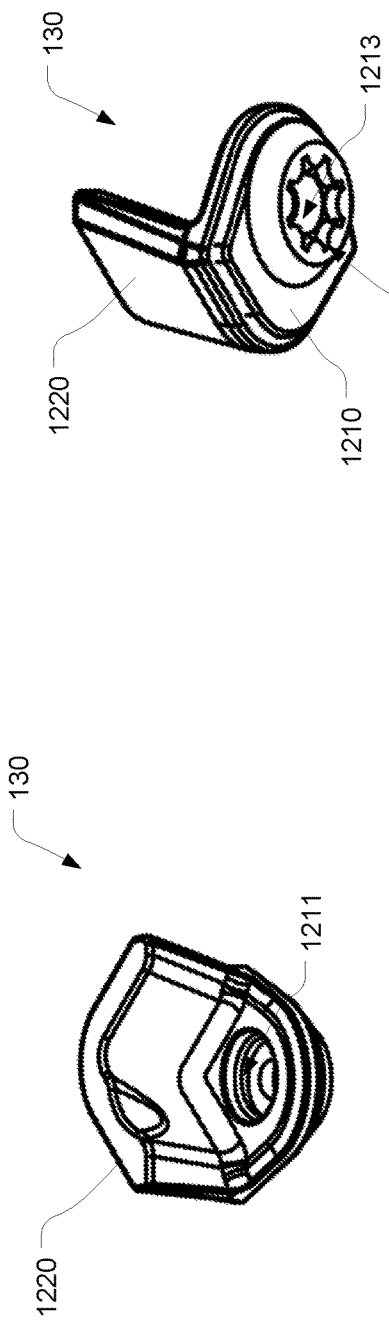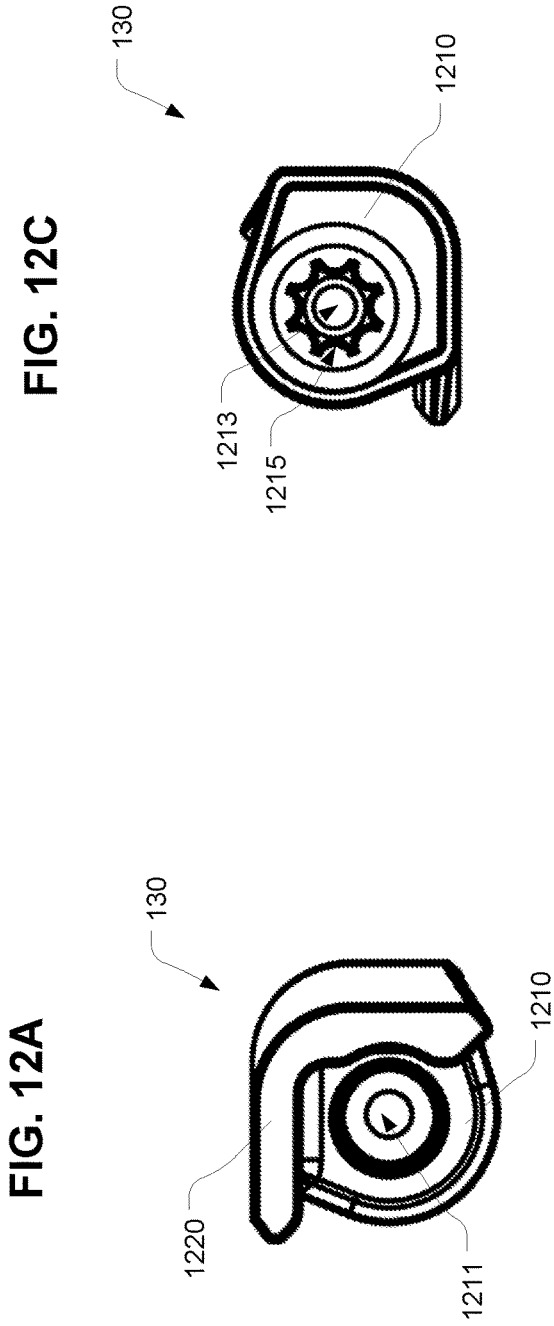
FIG. 12C
FIG. 12D
FIG. 12A
FIG. 12B

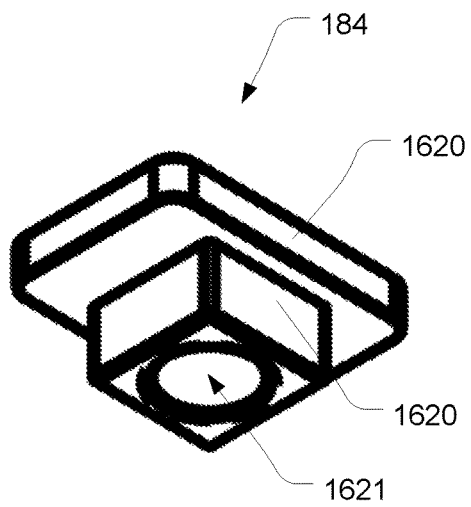 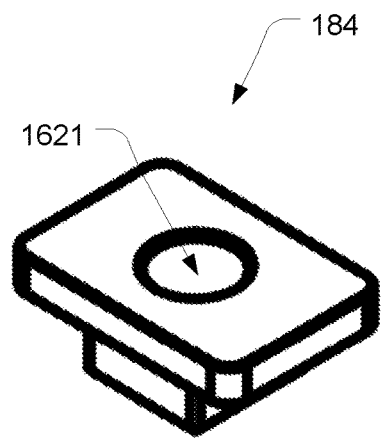
FIG. 16A     FIG. 16B
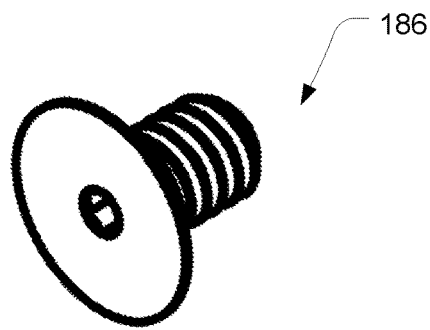
FIG. 17

UNIVERSAL MOUNTING APPARATUS FOR MOBILE ELECTRONIC DEVICES

BACKGROUND OF THE INVENTION

Field of the Invention

Embodiments of the present invention generally relate to a mounting device, and more particularly to a universal mounting apparatus for mobile electronic devices configured for use with portable stands and for mounting to a handle.

Description of the Related Art

Handheld electronic devices are common everyday devices that are heavily relied upon by their owners for different purposes. For example, smartphones are used for emails, navigation, textual and voice communication, digital camera functions, etc. Thus, it is sometimes difficult for one to be without their smartphone or similar device.

Digital cameras have long surpassed traditional film cameras in popularity due to the combination of convenience, cost, and photo quality. Digital cameras themselves have recently evolved from standalone camera devices to multi-purpose mobile devices, such as tablet computers and mobile phones, featuring integrated digital camera functionality. These multipurpose mobile devices make further improvements on user convenience but often lack the photo quality that standalone camera devices offer.

In addition to photography, people rely on their mobile phones for contact with others, for work, etc. Thus, most users want full access to their mobile devices irrespective of the activities they are engaged in. Most users like having the screen and controls of the mobile device within easy access irrespective of the activity. Hence, the myriad of phone mounts that are in the market.

Standard phone mounts are configured for mounting inside a vehicle, e.g. on dashboard or windshield. These mounts are usually not configured for mounting securely on vehicles with handles such as bicycles and motorcycles or vehicles that are subject to harsh operational environment. Thus, most two-wheeled vehicle operators carry their mobile phones in their pocket.

Accordingly, there is a need for a device for securely mounting a mobile phone on a handle bar of a two-wheeled vehicle that is also compatible with standard tripod devices.

BRIEF SUMMARY OF THE INVENTION

One or more embodiments of the invention are directed a universal mounting apparatus for mobile electronic devices such as smartphones and tablets. The apparatus comprises an elongate main body, a first clamp coupled to a one end of the elongate main body, a second clamp coupled to the opposing end of the elongate main body, and an external mounting bracket coupled to the main body.

In one or more embodiments, the main body comprises a first end with a first opening for access to a first axial cavity extending from the first opening to a midpoint of the elongate main body. The main body further comprises a second opening on the second end that is opposite the first end for access to a second axial cavity extending from the second opening to the midpoint of the elongate main body.

In one or more embodiments, the first clamp comprises a center retainer fixedly coupled to a mounting end of a first main rail. The first main rail having a substantially elongate profile with a second opposite end to the mounting end slidably coupled inside the first axial cavity in the elongate main body. The second opposite end of the main rail having a substantially rectangular cut-out, i.e. an elongated slot, for a guide post. The cut-out running axially along the first main rail such that the first main rail may slide axially along the length of the elongate main body from the midpoint through the first opening.

In one or more embodiments, the apparatus further comprises a first axially-mounted spring having a first coiled end engaged with a static anchoring point adjacent to the first opening, and a second coiled end engaged with the substantially rectangular first main rail cut out, wherein the axially-mounted spring imparts a force gulling the first main rail toward the midpoint of the elongate main body.

In one or more embodiments, the apparatus further comprises a second clamp comprising a mounting platform fixedly coupled to a mounting end of a second main rail. The second main rail having a substantially elongate profile with a second opposite end to the mounting end slidably coupled inside a second axial cavity in the elongate main body. The second opposite end having a substantially rectangular cut-out, i.e. an elongated slot, for a guide post. The cut-out running axially along the second main rail such that the second main rail may slide axially along the length of the elongate main body from the midpoint through the second opening.

In one or more embodiments, the apparatus further comprises a second axially-mounted spring having a first coiled end engaged with a static anchoring point adjacent to the second opening, and a second coiled end engaged with the substantially rectangular second main rail cut-out, wherein the axially-mounted spring imparts a force pulling the second main rail toward the midpoint of the elongate main body.

In one or more embodiments, the second clamp comprises a horizontal rail fixedly coupled at its midpoint to the mounting end of the second main rail, wherein the horizontal rail includes a pair of equal length elongated cut-outs (i.e. slots) on both sides of the midpoint of the horizontal rail. The second clamp further comprising a corner retainer at opposing ends coupled to the horizontal rail at each of the elongated cut-outs, wherein each of the corner retainer is horizontally adjustable to a desired size based on the device to be mounted. The corner retainer comprises a contact base with an elastomeric contact element and an angled support member, or brace, rising substantially vertical from the base.

In one or more embodiments, the elongate main body further comprises one or more first ports for delivering access to the first main rail in the first axial cavity. A first compressive retainer having a head outside the elongate main body and a contact terminus at the opposing end may be inserted (e.g. threaded) through the one or more first ports such that the contact terminus will selectively engage the first main rail.

In one or more embodiments, the elongate main body further comprises one or more second ports for delivering access to second main rail in the second axial cavity. A second compressive retainer having a head outside the elongate main body and a contact terminus at the opposing end may be inserted (e.g. threaded) through the one or more second ports such that the contact terminus will selectively engage the second main rail.

One or more embodiments of the present invention further comprises an external mounting bracket selectively coupled to the elongate main body through friction fit of a retention nut coupled within the elongate main body and a set screw extending inwardly from the mounting bracket and engaged with the retention nut.

In one or more embodiments, the elongate main body comprises a first end with a first opening for access to the first axial cavity extending from the first opening to a midpoint of the elongate main body and a second opening at the opposing end of the first end, for access to the second axial cavity extending from the second opening to the midpoint of the elongate main body. The first and second axial cavities each include one or more guideposts for a rail.

In one or more embodiments, the elongate main body further comprises a slot at the top of the elongate main body at approximately the midpoint of the main body that is configured as center support element for the smart device and as a backstop for the main rails.

In one or more embodiments, the elongate main body further comprises a first access port in the elongate main body for access to the first axial cavity and a second access port in the elongate main body for access to the second axial cavity. The first and second access ports are configured to hold a compressive retainer element for selectively restricting the motion of the main rail.

In one or more embodiments, the elongate main body further comprises a channel at the bottom side of the elongate main body for securing the external mounting bracket. The external mounting bracket facilitates mounting the apparatus to an object such as a handlebar of a bicycle.

In one or more embodiments, the mounting platform comprises a horizontal rail coupled to the main rail. The horizontal rail includes a pair of elongate cut-outs equally space from the midpoint of the horizontal rail, and a pair of adjustable mounting arms selectively coupled to each of the pair of elongate cut-outs, wherein each of the pair of adjustable mounting arms (e.g. combination of the corner retainer and corner retainer base) includes a contact base with an elastomeric material and an angled support member rising substantially vertical from the base.

In one or more embodiments, the first and second clamps comprise the mounting platform.

BRIEF DESCRIPTION OF THE DRAWINGS

The above and other aspects, features and advantages of the invention will be more apparent from the following more particular description thereof, presented in conjunction with the following drawings wherein:

FIG. 4 is an exploded view of the universal mounting apparatus for mobile electronic devices with a mobile phone mounted thereon in accordance with one or more embodiments of the present invention.

FIG. 12A is a top-side isometric view of the corner retainer of the universal mounting apparatus for mobile electronic devices in accordance with one or more embodiments of the present invention.

FIG. 12B is a top plan view of the corner retainer of the universal mounting apparatus for mobile electronic devices in accordance with one or more embodiments of the present invention.

FIG. 12C is a bottom-side isometric view of the corner retainer of the universal mounting apparatus for mobile electronic devices in accordance with one or more embodiments of the present invention.

FIG. 12D is a bottom plan view of the corner retainer of the universal mounting apparatus for mobile electronic devices in accordance with one or more embodiments of the present invention.

FIG. 16A is a bottom-side isometric view of the square nut of the universal mounting apparatus for mobile electronic devices in accordance with one or more embodiments of the present invention.

FIG. 16B is a top-side isometric view of the square nut of the universal mounting apparatus for mobile electronic devices in accordance with one or more embodiments of the present invention.

FIG. 17 is an isometric view of the adapter screw for securing the mounting adapter of the universal mounting apparatus for mobile electronic devices in accordance with one or more embodiments of the present invention.

DETAILED DESCRIPTION

Figure 1A:
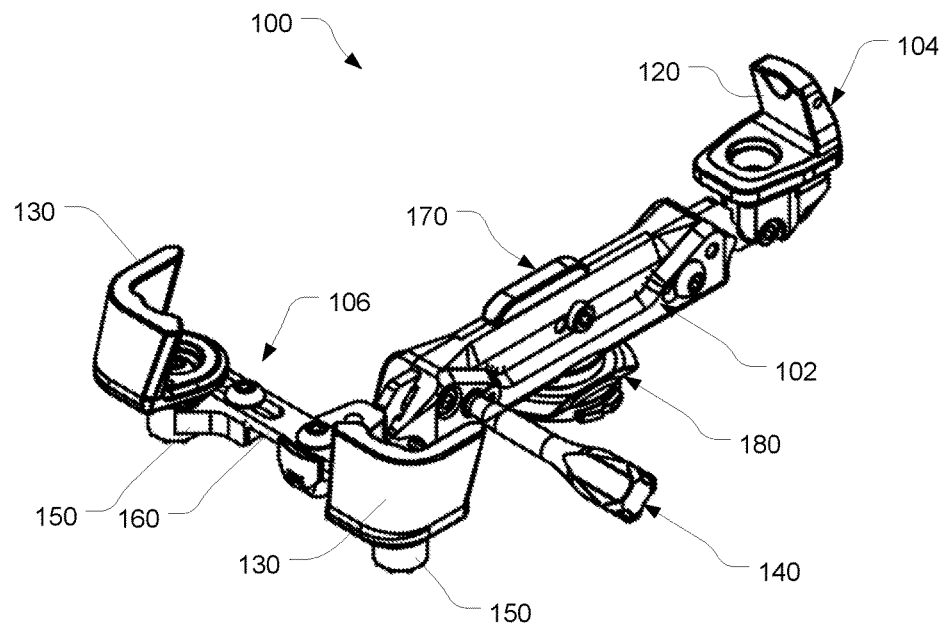
FIG. 1A is a top-side isometric view of the universal mounting apparatus for mobile electronic devices in accordance with one or more embodiments of the present invention.
Figure 1B:
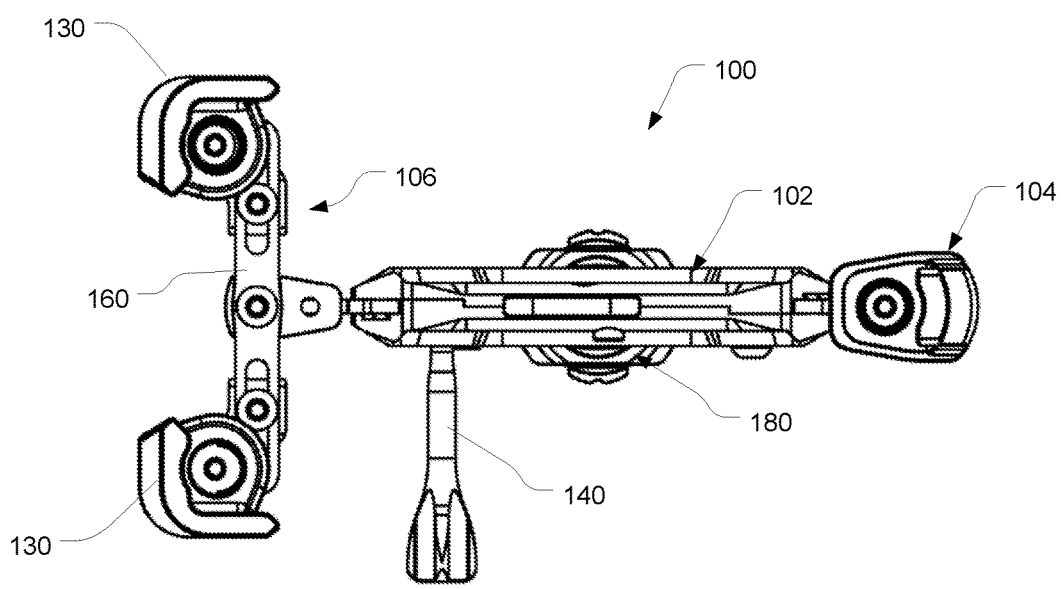
FIG. 1B is a top plan view of the universal mounting apparatus for mobile electronic devices in accordance with one or more embodiments of the present invention.
Figure 1C:
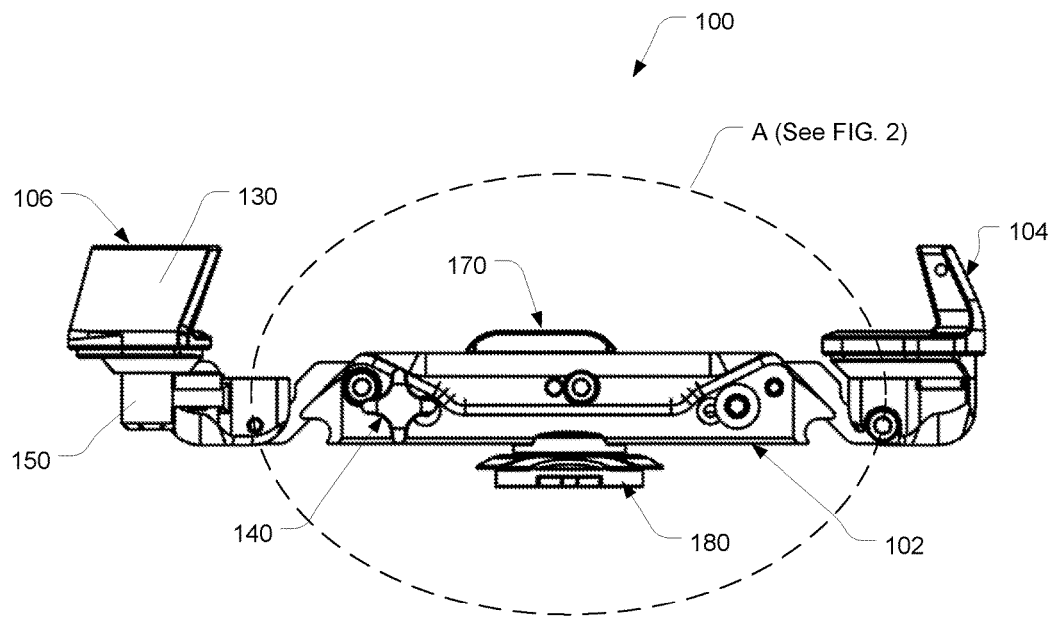
FIG. 1C is a right side elevation view of the universal mounting apparatus for mobile electronic devices in accordance with one or more embodiments of the present invention.

The present invention comprising a universal mounting apparatus for mobile electronic devices will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the present invention will now be described with references to FIGS. 1-17.

FIGS. 1A-1D are different views of an embodiment 100 of the universal mounting apparatus of the present invention. Device 100 enables a user to attach a smartphone or other smart device 310 (FIGS. 3A-B) to a tripod, other portable stand, or any handle suitable for stabilizing the smartphone for a particular task, e.g. photography, videography, or for securing the smart device 310 to a two-wheeled vehicle, e.g. the handlebar of a bicycle or motorcycle. It should be noted that device 100 may also be used for tablet computers and other mobile devices.

As illustrated, device 100 comprises a main body (housing) 102; a top clamp 104 coupled to the top end of the main body; a bottom clamp 106 coupled to the bottom end of the main body 102; and a mounting adapter 180 coupled to the bottom side of the main housing 102.

In one or more embodiments, the main body 102 is an elongate platform comprising a left side panel 110(A) coupled to a right side panel 110(B), with the inside faces of the left and right panels abutting. As illustrated in FIG. 4, a first end of a first panel 110, e.g. 110(A), is aligned to a second end of a second panel 110, e.g. 110(B), and the second end of the first panel 110, e.g. 110(A), is aligned to the first end of the second panel 110, e.g. 110(B). Panels 110(A) and 110(B) may be coupled together using a plurality of screws, e.g. 111, or any other suitable coupling means. For instance, a first screw 111 may be coupled through a hole 501 at a first end of the first panel to threaded hole 505 at the second end of the second panel. Similarly, a second screw 111 may be coupled through hole 501 at the second end of the first panel to threaded hole 505 at the first end of the second panel. Additionally, a third screw 111 may be coupled through hole 507 of the first panel to threaded hole 509 of the second panel, as illustrated in FIG. 4. The third screw may provide additional function of securing a center support element 170.

FIGS. 5A-D are illustrations of various views of the main body panel 110 in accordance with one or more embodiments of the present invention. As illustrated, main body panel 110 is an elongate member with a guidepost 523 on the first end of the inside face (FIG. 5D), and a groove 525 on the second end for securing the guide post from an opposing panel. The guidepost 523 is configured to fit into elongated slot (or cut-out) 711 of the main rail 190 thus supporting the main rail inside the main body 102 (see FIG. 2.) and providing a post for the main rail to slide on during the axial motion.

Figure 1D:
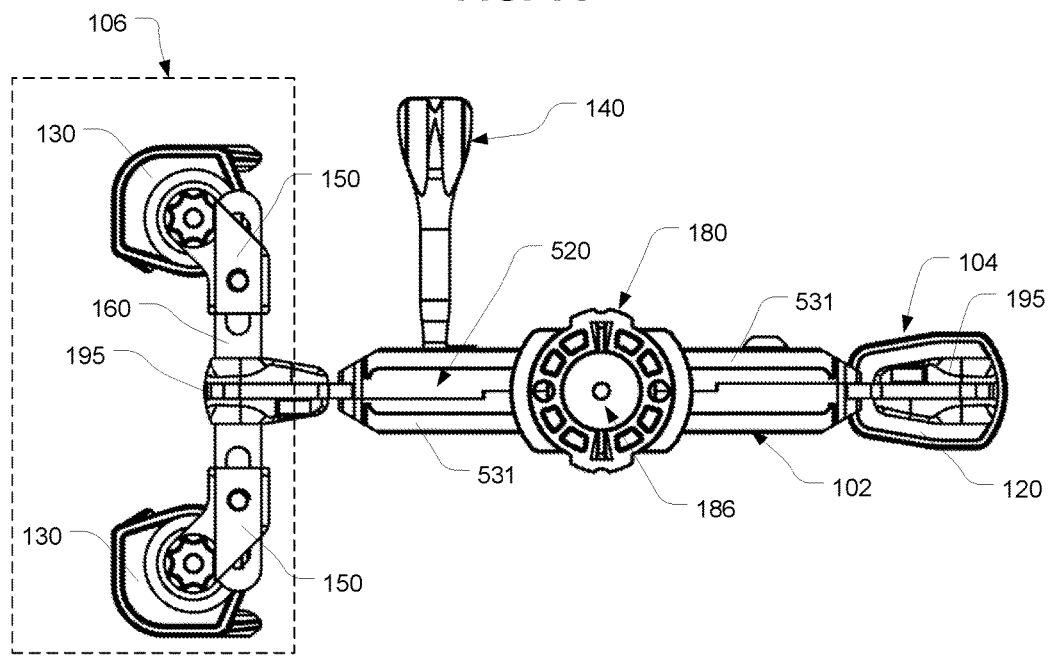
FIG. 1D is a bottom plan view of the universal mounting apparatus for mobile electronic devices in accordance with one or more embodiments of the present invention.
Figure 5A:
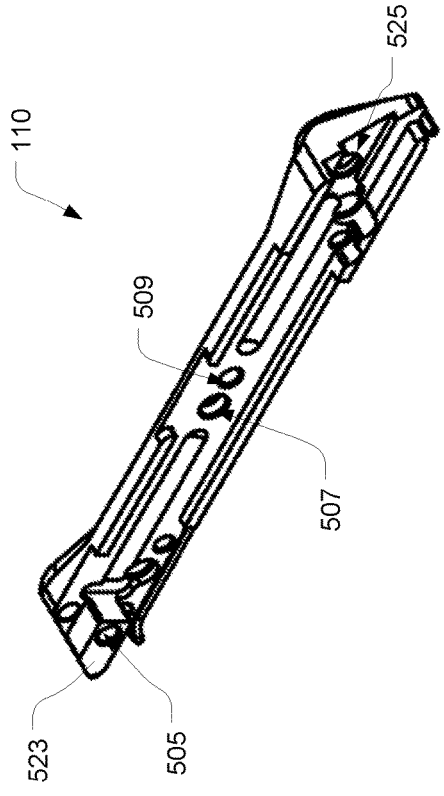
FIG. 5A is an isometric view of the outside face of the main body component of the universal mounting apparatus for mobile electronic devices in accordance with one or more embodiments of the present invention.
Figure 5B:
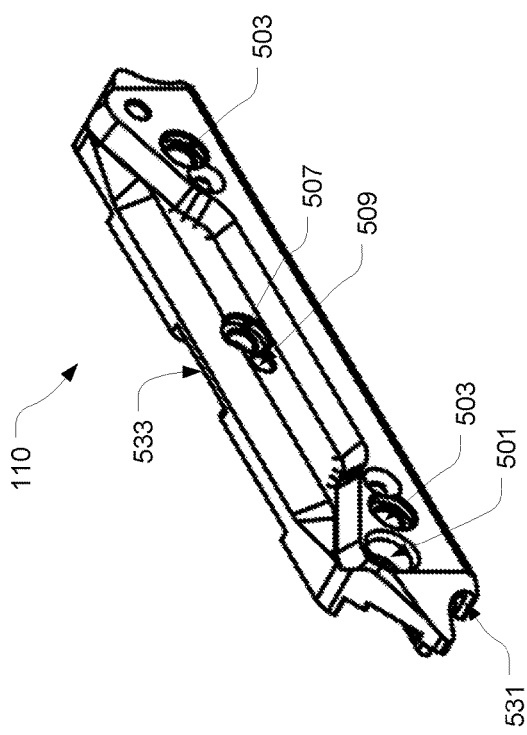
FIG. 5B is a rear elevation view of the main body component of the universal mounting apparatus for mobile electronic devices in accordance with one or more embodiments of the present invention.
Figure 5C:
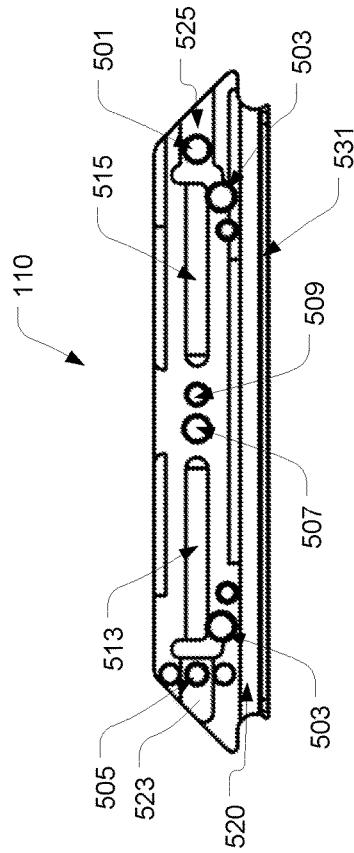
FIG. 5C is an isometric view of the inside face of the main body component of the universal mounting apparatus for mobile electronic devices in accordance with one or more embodiments of the present invention.
Figure 5D:
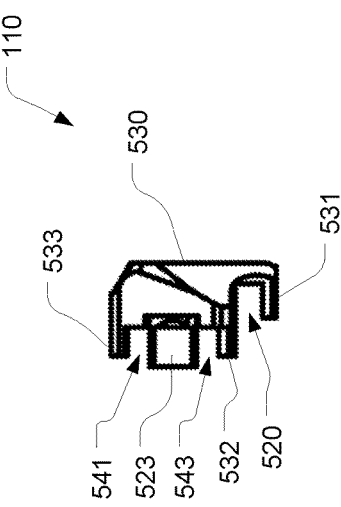
FIG. 5D is a side elevation view of the inside face of the main body component of the universal mounting apparatus for mobile electronic devices in accordance with one or more embodiments of the present invention.

As illustrated further in FIG. 5B, the main body panel 110 comprises a side wall 530; a top wall 533 extending inwardly from the top of the sidewall 530; and a bottom wall 532 extending inwardly from the sidewall 530 to form a housing enclosure for the spring 115 and the main rail 190. The sidewall 530 further extends below the bottom wall 532 and terminates in an inwardly extending flange 531 at the bottom of the main body panel. The flange 531 spans the length of the panel from the first end to the second end such that when the left and right body panels are coupled, flange 531 of the left panel and flange 531 of the right panel together form an axial channel 520 of the main body for securing square nut 184. As illustrated in FIG. 1D, in one or more embodiments, flange 531 tappers towards the inside face at the first and second ends of the main body panel 110 thus securing square nut 184 inside axial channel 520 when the left and right side panels are coupled.

Figure 2:
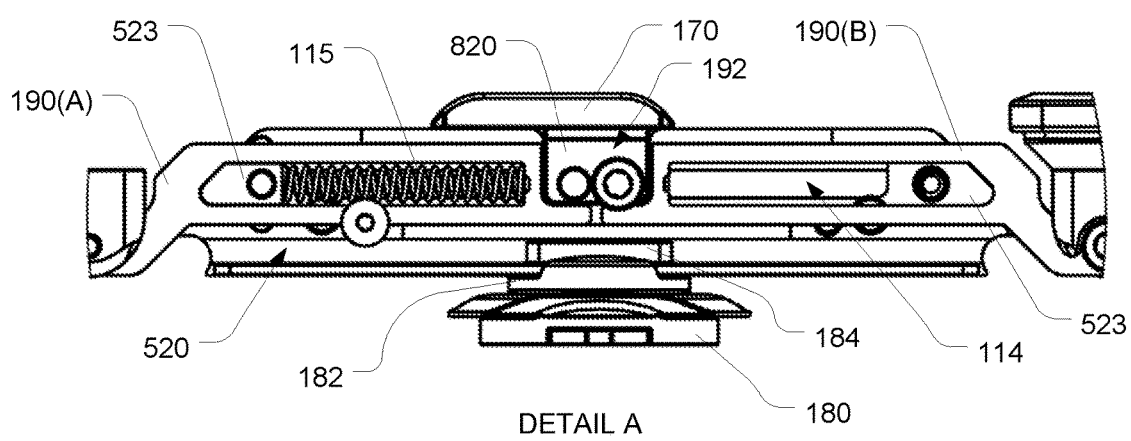
FIG. 2 is a close-up detailed view of Section A of the universal mounting apparatus for mobile electronic devices without the right main panel in accordance with one or more embodiments of the present invention.
Figure 3A:
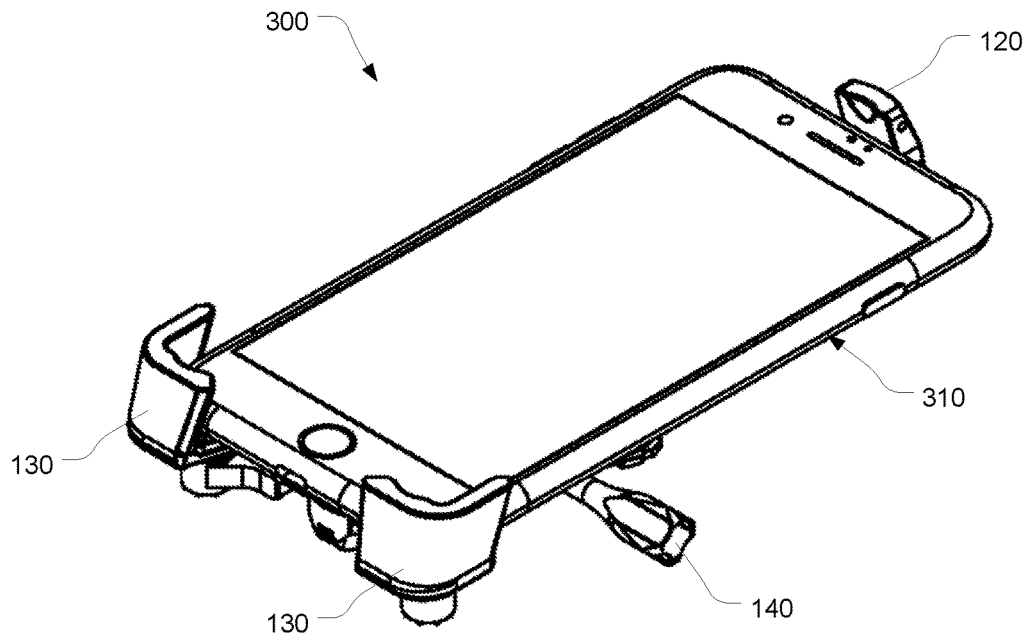
FIG. 3A is a top-side isometric view of the universal mounting apparatus for mobile electronic devices with a mobile phone mounted thereon in accordance with one or more embodiments of the present invention.
Figure 3B:
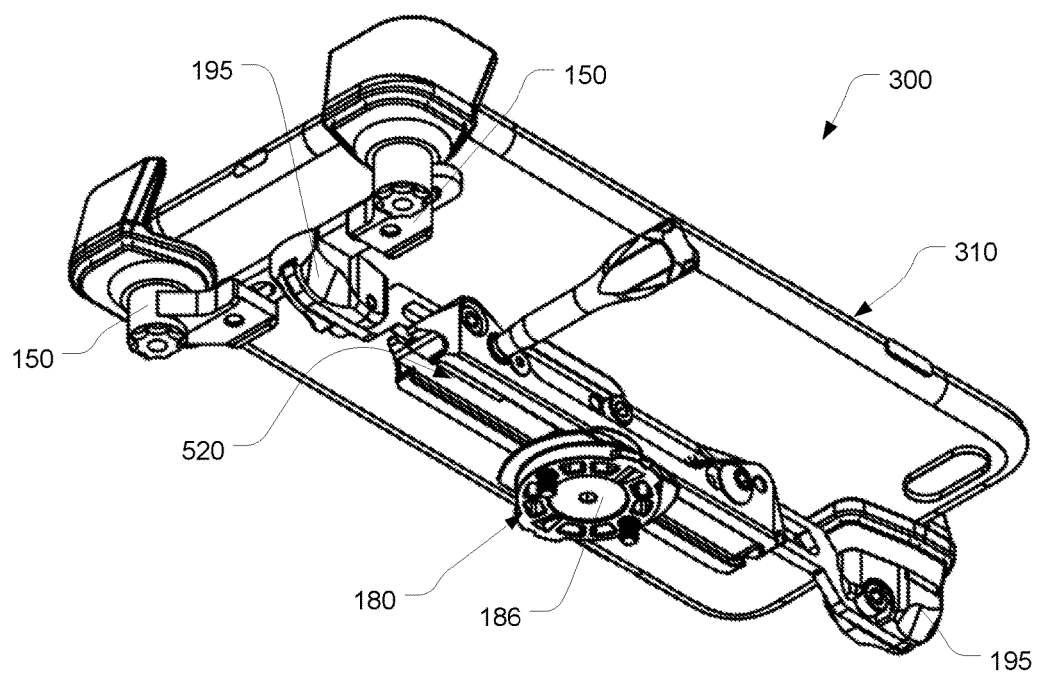
FIG. 3B is a bottom-side isometric view of the universal mounting apparatus for mobile electronic devices with a mobile phone mounted thereon in accordance with one or more embodiments of the present invention.

The main body panel 110 further comprises a first groove 513 running approximately from the center of the panel to the beginning of guidepost 523, and a second groove 515 running approximately from the center of the panel to the beginning of groove 525. The width of the grooves, e.g. 513 or 515, is configured to be approximately the width of elongated slot 711 (FIG. 7) of main rail 190. When panels 110(A) and 110(B) are coupled together with the main rail 190 therebetween, groove 513 of the left panel, elongated slot 711 of the main rail 190, and groove 515 of the right panel combine to form a first axial cavity 114. Similarly, groove 515 of the left panel, elongated slot 711 of the main rail 190, and groove 513 of the right panel combine to form a second axial cavity 114. As illustrated in FIG. 2, axial cavity 114 is configured to house compression spring 115.

Figure 5E:
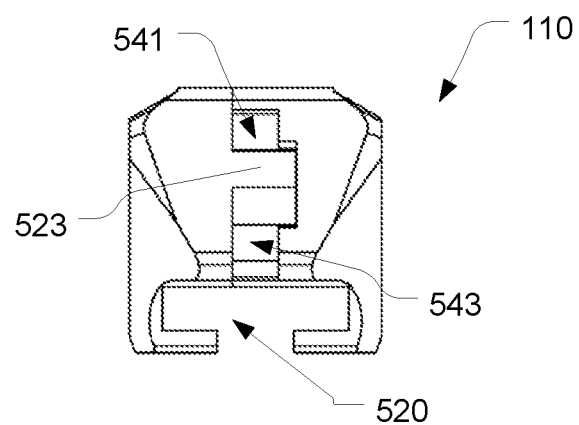
FIG. 5E is a front elevation view of the main body with the left and right components coupled in accordance with one or more embodiments of the present invention.

As illustrated in FIG. 5E, the first end of the main body 102 comprises one or more first openings, e.g. 541 above and 543 below the guidepost 523, for access to a first axial cavity 114 that extends to approximately a midpoint of the main body 102. Opening 541 is configured to slidably fit upper rail section 701 and opening 543 is configured to slidably fit lower rail section 703 of main rail 190. Inside the main body, the first axial cavity is configured to include the chamber for spring 115. The first axial cavity is configured to slidably couple the top clamp 104 through the main body section 710 of main rail 190.

Similarly, the second end of the main body 102 comprises one or more second openings, e.g. 541 above and 543 below the guidepost 523, for access to a second axial cavity 114 that extends to approximately a midpoint of the main body 102. Opening 541 is configured to slidably fit upper rail section 701 and opening 543 is configured to slidably fit lower rail section 703 of main rail 190. Inside the main body, the second axial cavity is configured to include a second chamber for spring 115. The second axial cavity is configured to slidably couple the bottom clamp 106 through the main body section 710 of main rail 190.

As illustrated in FIG. 4, each clamp includes a main rail 190, i.e. an upper main rail 190(A) and a lower main rail 190(B). The two main rail configuration allows for independently extending the top clamp 104 and the bottom clamp 106 with respect to the main body 102.

In one or more embodiments, one or more compression springs may be housed in one or both chambers 114. For instance, in the embodiment illustrated in FIG. 2, only one compression spring 115 is housed in one spring chamber 114. The second spring chamber is left empty. In this illustration, the top clamp 104 is fixed in place while the bottom clamp 106 is allowed to axially extend with respect to the main body 102 by compressing the spring, i.e. pulling away from the main body. The thumbscrew 140 may be used to secure (or lock) the main rail thus preventing the bottom clamp from unintended motion. The main body 102 comprises one or more threaded ports 503 through which compressive force may be applied on the main rail, for instance using thumbscrew 140 or other screw to selectively apply friction force on the main rail thereby restricting its motion. The compressive retainer element, e.g. thumbscrew, may be placed on the left or right side of the main body, depending on user preference.

In one or more embodiments, a first coiled end of spring 115 is anchored on one end of the main body inside the axial cavity 114, while compressive force is applied to opposing end of the spring by the end of elongated slot (or cut-out) 711 of the main rail.

In another exemplary embodiment, a compression spring 115 is housed in each chamber 114. In such configuration, two thumbscrews may be used to lock the rails in place. Note that the thumbscrews are optional and are provided to prevent the mobile phone 310 from dislodging when subject to hash environment, such as those encountered in bicycling activities. Those of skill in the art would appreciate that embodiments with or without a compression spring or thumbscrews are also contemplated.

Figure 6A:
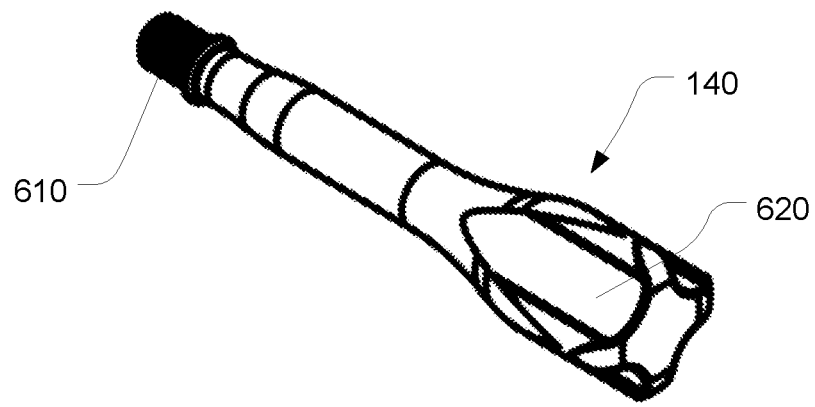
FIG. 6A is an isometric view of the thumbscrew of the universal mounting apparatus for mobile electronic devices in accordance with one or more embodiments of the present invention.
Figure 6B:
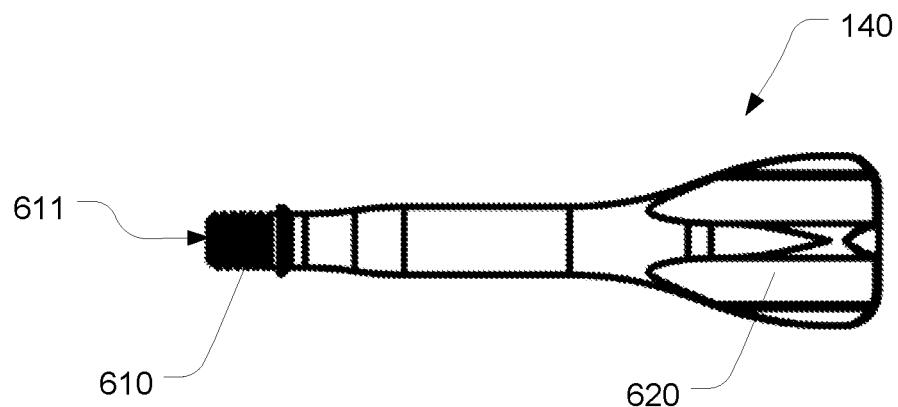
FIG. 6B is a side elevation view of the thumbscrew of the universal mounting apparatus for mobile electronic devices in accordance with one or more embodiments of the present invention.

FIG. 6A-B are illustrations of different views of the compressive retainer 140, e.g. thumbscrew, of the universal phone mount in accordance with one or more embodiments of the present invention. As illustrated, thumbscrew 140 comprises threaded screw section 610 and head section 620 for operating the thumbscrew. The end of the threaded screw section 610 comprises a contact terminus 611 for selectively engaging and securing the main rail 190 by imparting friction. Thumbscrew 140 is threaded through port 503 of the main body to selectively contact and apply compressive force on the main rail.

Figure 8A:
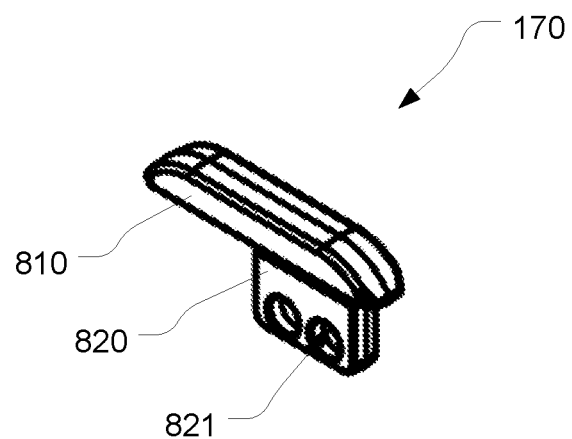
FIG. 8A is an isometric view of the center support of the universal mounting apparatus for mobile electronic devices in accordance with one or more embodiments of the present invention.
Figure 8B:
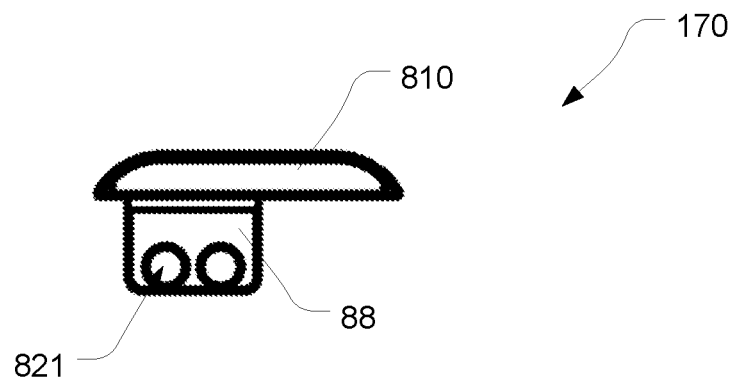
FIG. 8B is a side elevation view of the center support of the universal mounting apparatus for mobile electronic devices in accordance with one or more embodiments of the present invention.

The main body 102 further comprises a slot 192 for holding a center support member 170 sandwiched between the left and right side panels. The perimeter of slot 192 comprises combination of walls of grooves 533 on the left and right main body panels, 110(A) and 110(B). The center support member 170 acts as a backstop for the main rails. FIGS. 8A-B are illustrations of different views of the center support 170 of the universal phone mount in accordance with one or more embodiments of the present invention. As illustrated, center support member 170 comprises a base section 810 and a foot section 820 extending from the bottom of the base section. The foot section 820 includes one or more holes 821 for pass-through of center screw 111 to hold the center support in place when the left and right main body panels are coupled. The center support 170 is preferably made of material that would not scratch the body of the mobile device 310, e.g. nylon, polypropylene, thermoplastic elastomer, etc.

As illustrated in FIG. 2, foot section 820 is configured to fit into slot 192 (see FIG. 2) on top of the main body thus acting as a backstop for a first main rail 190(A) and a second main rail 190(B). The top of base section 810 of center support 170 abuts mobile phone 310 when mounted onto device 100.

Figure 9A:
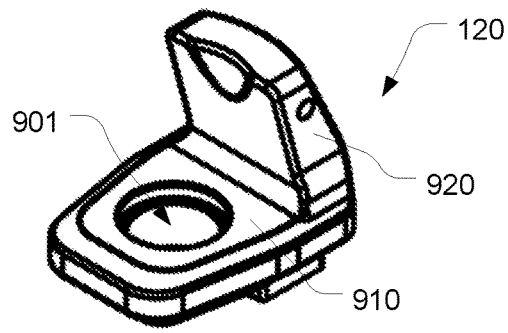
FIG. 9A is a top-side isometric view of the center retainer of the universal mounting apparatus for mobile electronic devices in accordance with one or more embodiments of the present invention.
Figure 9B:
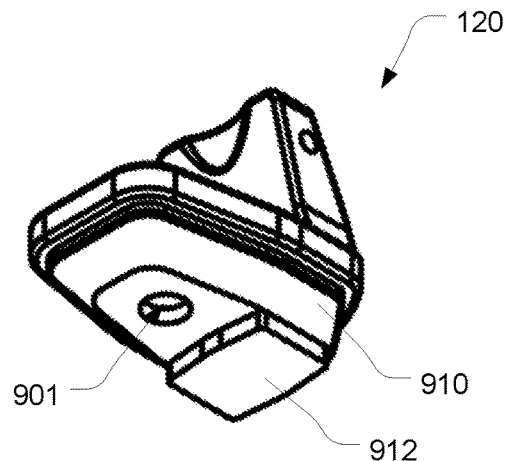
FIG. 9B is a bottom-side isometric view of the center retainer of the universal mounting apparatus for mobile electronic devices in accordance with one or more embodiments of the present invention.
Figure 9C:
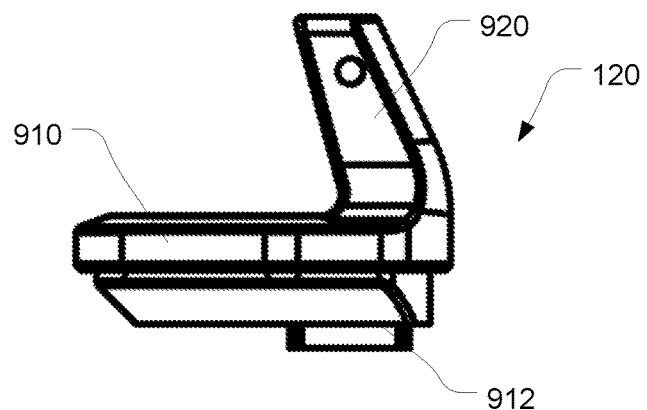
FIG. 9C is a side elevation view of the center retainer of the universal mounting apparatus for mobile electronic devices in accordance with one or more embodiments of the present invention.

In one or more embodiments, the top clamp 104 comprises a center retainer 120 coupled to the top of a retainer base 195(A) with screw 121; and a main rail 190(A) coupled to the bottom of retainer base 195(A) with a screw 196. FIG. 9A-C are illustrations of different views of the center retainer 120 of the universal phone mount in accordance with one or more embodiments of the present invention. As illustrated, center retainer 120 comprises a base section 910 and a clamp section 920. Center retainer 120 is approximately a V-shaped member with a first arm of the V being the base 910, and the second arm of the V being the clamp section 920, which extends upwards at the far end of base section 910 and then terminates with at a slight inclination towards the center of the base section.

The base section 910 comprises a hole 901 through which the center retainer 120 is secured to threaded hole 1003 in the retainer base 195(A) using screw 121. The base section 910 further comprises a foot 912 at the bottom side that is configured to snugly fit in slot 1011 of retainer base 195. The center retainer 120 is preferably made of material that would not scratch the body of the mobile device 310, e.g. nylon, polypropylene, thermoplastic elastomer, etc.

Figure 10A:
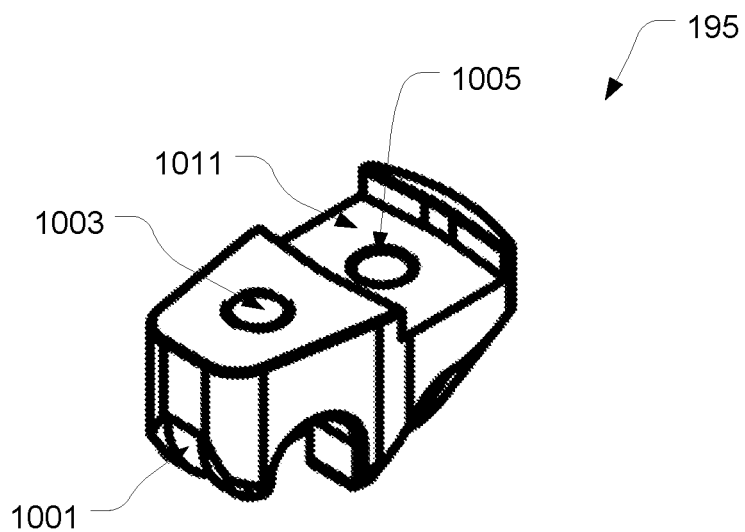
FIG. 10A is a top-side isometric view of the retainer base of the universal mounting apparatus for mobile electronic devices in accordance with one or more embodiments of the present invention.
Figure 10B:
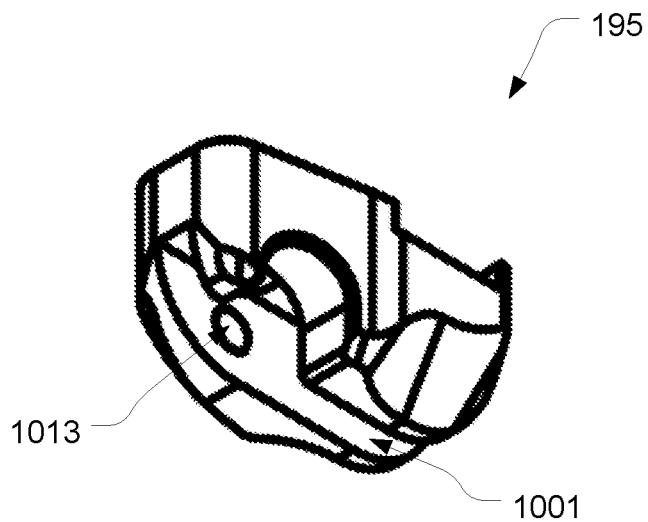
FIG. 10B is a bottom-side isometric view of the retainer base of the universal mounting apparatus for mobile electronic devices in accordance with one or more embodiments of the present invention.

FIG. 10A-B are illustrations of different views of the retainer base 195 of the universal phone mount in accordance with one or more embodiments of the present invention. As illustrated, retainer base 195 comprises, at its top section, a horizontal slot 1011 with a vertical threaded hole 1005 at the distal end, and vertical threaded hole 1003 at its proximal end; and a bottom section with a vertical axial slot 1001 and a horizontal threaded hole 1013 on the sidewall of the slot. Slot 1001 is configured to snugly fit clamp section 720 of main rail 190. The clamp section 720 of the main rail is secured to retainer base 195 in slot 1001 using screw 196 through slot 721 on the main rail to the threaded hole 1013 on the retainer base. The length of retainer base 195 is approximately the length of clamp section 720 of main rail 190.

Figure 7A:
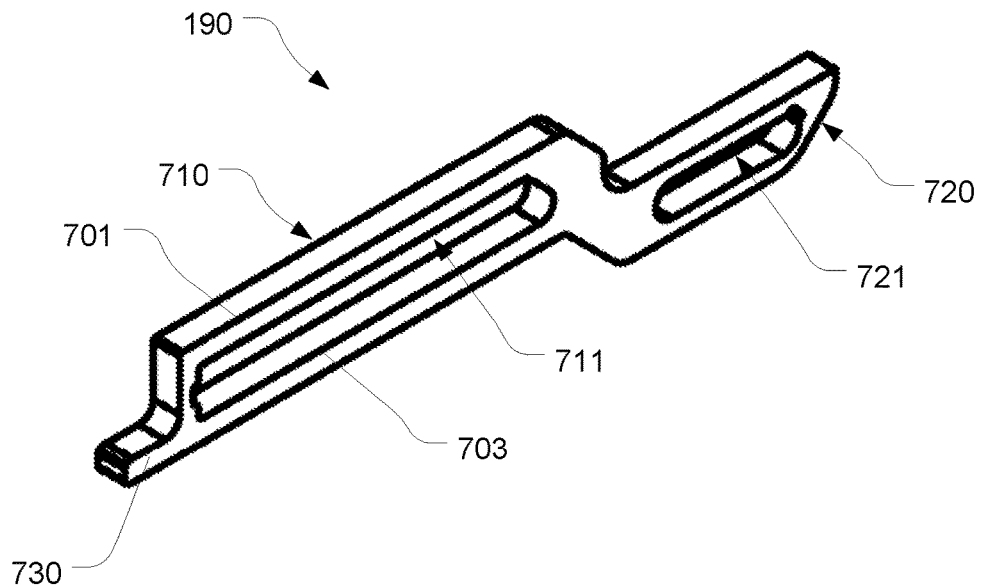
FIG. 7A is an isometric view of the main rail of the universal mounting apparatus for mobile electronic devices in accordance with one or more embodiments of the present invention.
Figure 7B:
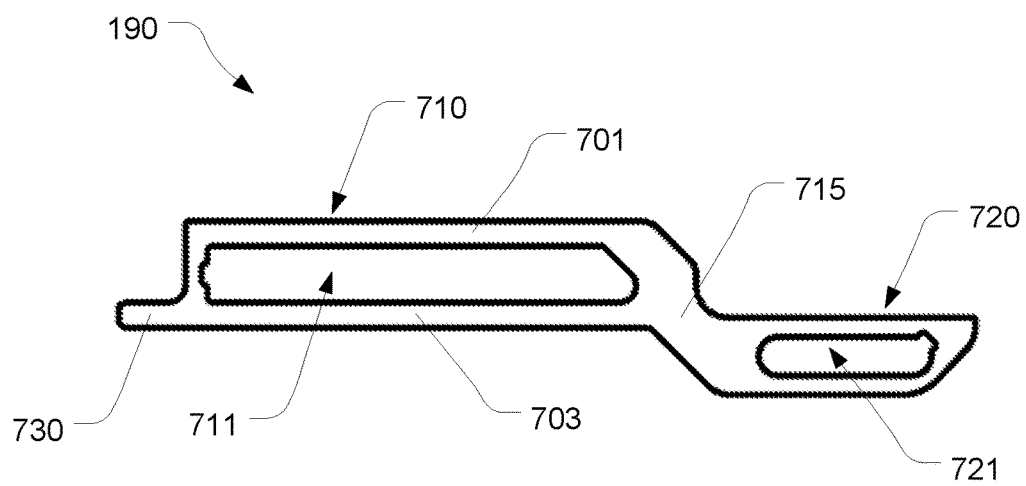
FIG. 7B is a side elevation view of the main rail of the universal mounting apparatus for mobile electronic devices in accordance with one or more embodiments of the present invention.

FIGS. 7A-B are illustration of different views of the main rail 190 of the universal phone mount in accordance with one or more embodiments of the present invention. As illustrated, main rail 190 is a thin elongated member comprising a main body section 710 at one end (i.e. distal) and a clamp section 720 at the opposing end (i.e. proximal) separated by an angled connecting section 715 such that clamp section 720 is at a lower plane than main body section 710. The main body section 710 comprises an elongated slot 711 and terminates with an L-shaped tip 730 at its distal end. The clamp section 720 comprises a second slot 721 for securing the main rail to the retainer base 195.

As illustrated in FIG. 4, the main rail 190 comprises an upper main rail 190(A) and a lower main rail 190(B). The two main rail configuration allows for independently extending the top clamp 104 and the bottom clamp 106 with respect to the main body 102. In such embodiments, the top clamp 104 is slidably coupled to the main body 102 at main body section 710 of the upper main rail 190(A), and the bottom clamp 106 is slidably coupled to the main body 102 at main body section 710 of the lower main rail 190(B).

Figure 11A:
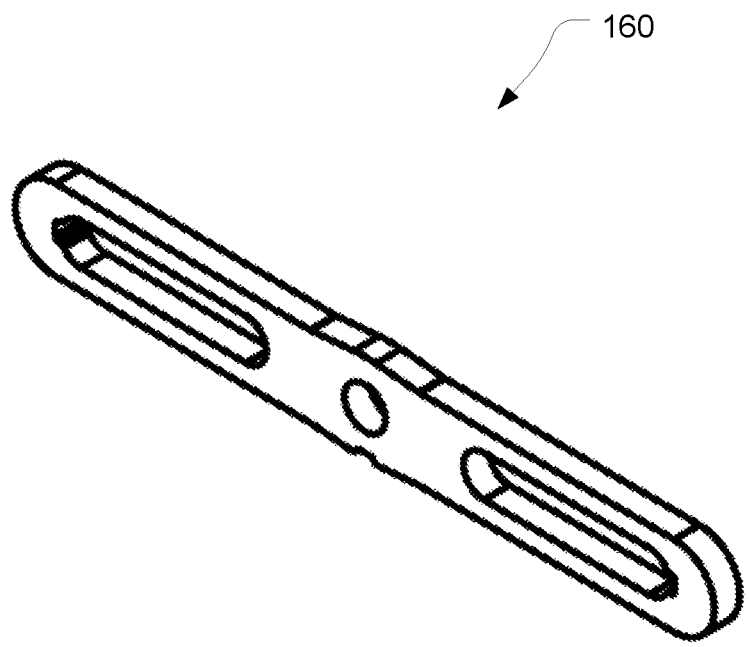
FIG. 11A is an isometric view of the horizontal rail of the universal mounting apparatus for mobile electronic devices in accordance with one or more embodiments of the present invention.
Figure 11B:
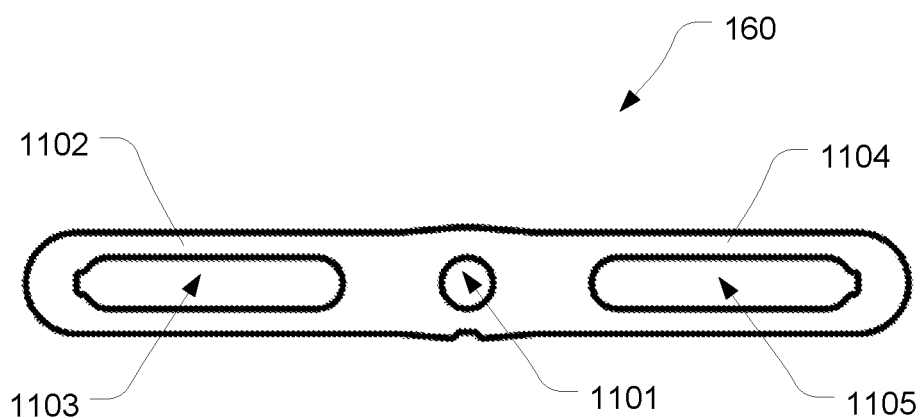
FIG. 11B is a side elevation view of the horizontal rail of the universal mounting apparatus for mobile electronic devices in accordance with one or more embodiments of the present invention.

In one or more embodiments, the bottom clamp 106 comprises a horizontal rail 160 coupled to a retainer base 195(B) with a screw 161; and a main rail 190(B) coupled to the retainer base 195(B) with a screw 196. FIG. 11A-B are illustrations of different views of the horizontal rail 160 of the universal phone mount in accordance with one or more embodiments of the present invention. As illustrated, horizontal rail 160 comprises an elongated member with hole 1101 at its geometric center, and complementary left and right wings (sections), 1102 and 1104. The left wing 1102 comprises an elongated slot 1103 and the right wing 1104 comprises an elongated slot 1105. The left and right elongated slots, i.e. 1103 and 1105, allow for widening or narrowing of the base clamp 106 to suite the particular mobile device 310.

In one or more embodiments, horizontal rail 160 is coupled to a retainer base 195(B), in slot 1011 using a screw 161 via threaded hole 1005. The clamp section 720 of the main rail is secured to retainer base 195 in slot 1001 using screw 196 via slot 721 on the main rail and threaded hole 1013 on the retainer base 195.

The bottom clamp 106 further comprises a corner retainer 130(A) coupled to the left horizontal rail section 1102 via a corner retainer base 150(A), and second corner retainer 130(B) coupled to the right horizontal rail section 1104 via a corner retainer base 150(B). In one or more embodiments, the left corner retainer 130(A) is configured specifically for the left side of the main body, and the right corner retainer 130(B) is configured specifically for the right side of the main body. FIG. 12A-D are illustrations of different views of the corner retainer 130 of the universal phone mount in accordance with one or more embodiments of the present invention. As illustrated, corner retainer 130 comprises a base section 1210 and a clamp section 1220. The base section 1210 comprises a hole 1211 through which the corner retainer 130 is secured to threaded hole 1311 in the corner retainer base 150(A) using screw 161. The base section 1210 further comprises a cavity 1213 with sprockets 1215, e.g. lugs or projections, which is one-half of an interlock mechanism, at the bottom side.

Clamp section 1220 of corner retainer 130 comprises a substantially vertical angled brace rising from the base section 1210 and configured to support a bottom corner of the mobile device 310. The corner retainer 130 preferably comprises of material that would not scratch the body of the mobile device 310, e.g. nylon, polypropylene, thermoplastic elastomer, etc.

Figure 13A:
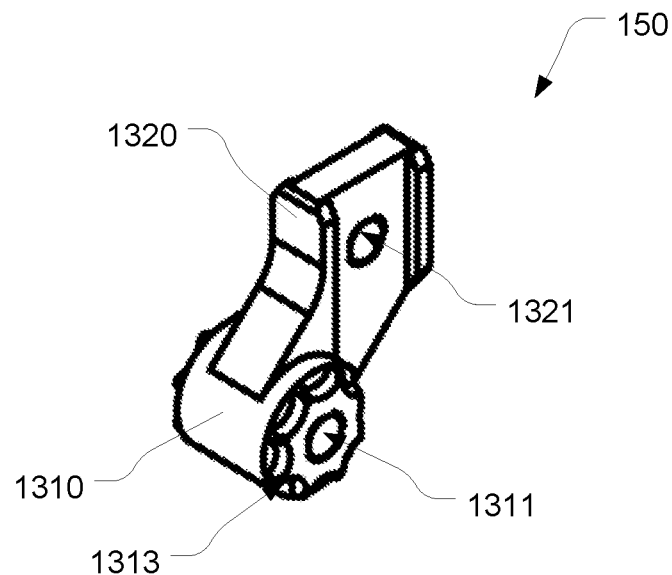
FIG. 13A is a top-side isometric view of the corner retainer base of the universal mounting apparatus for mobile electronic devices in accordance with one or more embodiments of the present invention.
Figure 13B:
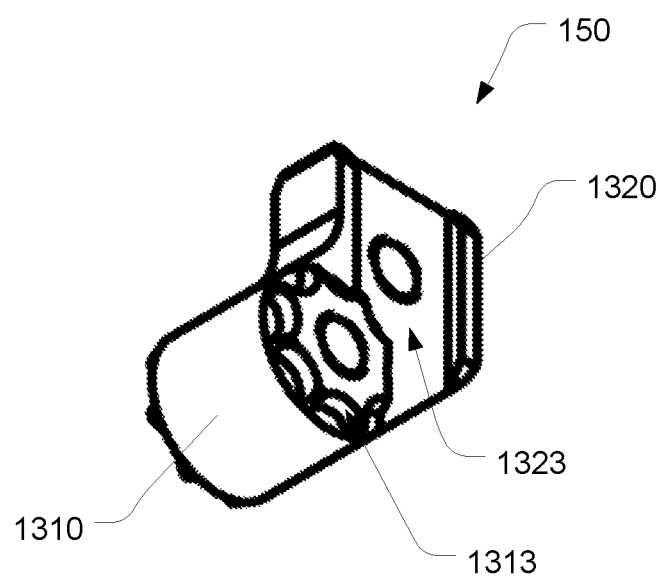
FIG. 13B is a bottom-side isometric view of the corner retainer base of the universal mounting apparatus for mobile electronic devices in accordance with one or more embodiments of the present invention.
Figure 14A:
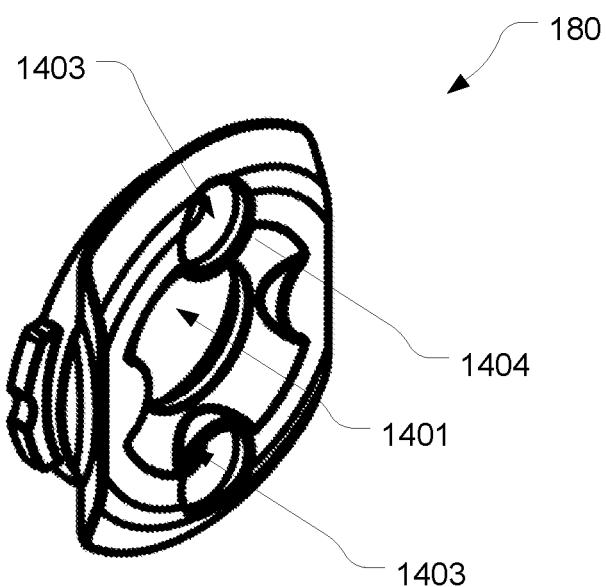
FIG. 14A is a top-side isometric view of the mounting adapter of the universal mounting apparatus for mobile electronic devices in accordance with one or more embodiments of the present invention.
Figure 14B:
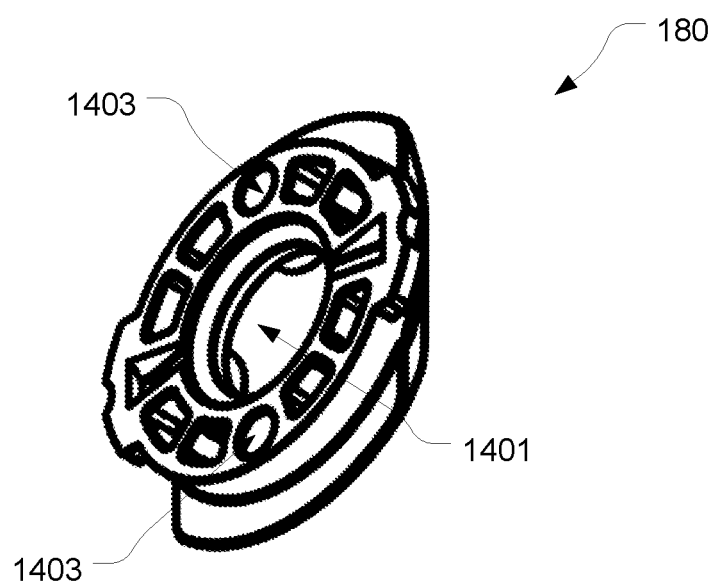
FIG. 14B is a bottom-side isometric view of the mounting adapter of the universal mounting apparatus for mobile electronic devices in accordance with one or more embodiments of the present invention.
Figure 15A:
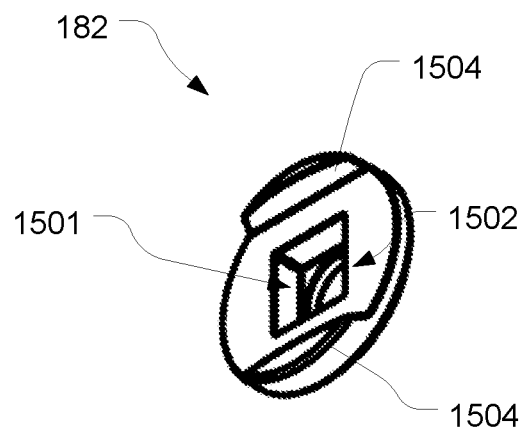
FIG. 15A is a top-side isometric view of the locking plate of the universal mounting apparatus for mobile electronic devices in accordance with one or more embodiments of the present invention.
Figure 15B:
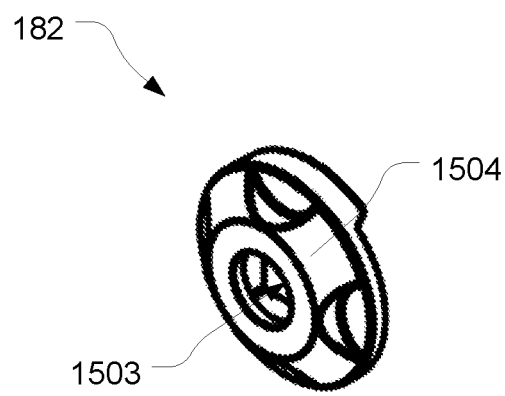
FIG. 15B is a bottom-side isometric view of the locking plate of the universal mounting apparatus for mobile electronic devices in accordance with one or more embodiments of the present invention.

FIGS. 13A-B are illustrations of different views of the corner retainer base 150 of the universal phone mount in accordance with one or more embodiments of the present invention. As illustrated, corner retainer base 150 comprises a handle section 1310 and a rail support section 1320. The rail support section 1320 comprises a channel 1323 configured to hold a wing of the horizontal rail, e.g. 1102 or 1104. Channel 1323 further comprises threaded hole 1321 for securing the corner retainer base 150 to horizontal rail 160 using screw 161 (see FIG. 4).

The handle section 1310 of corner retainer base 150 comprises a threaded hole 1311 and the second-half of the interlock mechanism with a plurality of interlocking members 1313, e.g. recesses or holes, on the top side of the handle 1310 of the corner retainer base 150.

Those of skill in the art would appreciate that other clamp configurations are contemplated. For instance, the top clamp 104 may be configured similar to bottom clamp 106 for embodiments wherein it is desirable to additionally secure the mobile device. Also, embodiments wherein pull springs are employed on the bottom clamp configuration are contemplated. Such pull springs configuration, e.g. one on each wing, may be desirable to apply pull force to the corner retainer bases 150, for instance.

In one or more embodiments, the main body 102 further comprises a mounting adapter 180. Mounting adapter 180 is secured to main body 102 via square nut 184 using locking plate 182. As illustrated in FIG. 2, top 1620 of square nut 184 is secured inside channel 520, the foot 1620 of square nut 184 protrudes outside the main body 102 and is coupled to and locked in cavity 1501 of locking plate 182. Locking plate 182 comprises a channel 1502 with sidewalls 1504 that are configured to snugly fit around a portion of the outer sidewall of the main body 102.

The bottom section of the locking plate 182 further comprises a hole 1503 and a plurality of sprockets 1506, e.g. lugs or projections, which is one-half of an adapter interlock mechanism, at the bottom side.

The mounting adapter 180 comprises the second-half of the adapter interlock mechanism with a plurality of interlocking members 1404, e.g. recesses or holes, on the top side and a center hole 1401 for the adapter screw 186. Adapter screw 186, e.g. a flat head socket cap screw or an Ultra-Low Head Cap Screw, is used to secured the mounting adapter 180 to the square nut 184 through locking plate 182. In one or more embodiments, mounting adapter 180 is configured to be secured to a standard mount. For instance, mounting adapter 180 may be a Garmin adapter for coupling to a Garmin Out-Front Bike Mount or a Garmin Varia Universal Out Front Mount, or any other functionally similar mount.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for securely mounting a mobile device, comprising:
   an elongate main body having a first end with one or more first openings for access to a first axial cavity extending from the one or more first openings to a midpoint of the elongate main body, and one or more second openings at an opposing end of the first end for access to a second axial cavity extending from the one or more second openings to the midpoint of the elongate main body;
   a first clamp comprising a first main rail with a substantially elongate profile slidably coupled in said first axial cavity through said one or more first openings, said first main rail comprising a substantially rectangular cut-out running axially along the first main rail;
   a second clamp comprising a second main rail with a substantially elongate profile slidably coupled in said second axial cavity through said one or more second openings, said second main rail comprising a substantially rectangular cut-out running axially along the second main rail, wherein the second clamp comprises a mounting platform with a horizontal rail coupled to the second main rail, wherein the horizontal rail includes a pair of elongate cut-outs equally spaced from a midpoint of the horizontal rail and a pair of adjustable mounting arms selectively coupled to each of the pair of elongate cut-outs, wherein each of the pair of adjustable mounting arms includes a base having an elastomeric contact and an angled brace rising substantially vertical from the base;
   a first port on a side of said elongate main body for selectively applying compressive force to said first main rail thereby restricting movement of said first main rail;
   a second port on a side of said elongate main body for selectively applying compressive force to said second main rail thereby restricting movement of said second main rail; and
   a channel on a bottom side of said elongate main body for coupling an external mounting adapter.

2. The apparatus of claim 1, further comprising:
   a first axially-mounted spring in said first axial cavity having a first coiled end engaged with a static anchoring point adjacent to the one or more first openings, and a second coiled end engaged with the substantially rectangular first main rail cut-out, wherein the first axially-mounted spring imparts a force pulling said first main rail toward the midpoint of the elongate main body.

3. The apparatus of claim 1, wherein the first clamp comprises a V-shaped element with an elastomeric contact surface.

4. The apparatus of claim 1, further comprising:
a second axially-mounted spring in said second axial cavity having a first coiled end engaged with a static anchoring point adjacent to the one or more second openings, and a second coiled end engaged with the substantially rectangular second main rail cut-out, wherein the second axially-mounted spring imparts a force pulling said second main rail toward the midpoint of the elongate main body.

5. The apparatus of claim 1, wherein said first and second ports are configured to retain a thumbscrew for applying said compressive force.

6. An apparatus for securely mounting a mobile device, comprising:
a main body having a first end with a first opening for access to a first axial cavity extending from the first opening to inside the main body, and a second opening at the opposing end of the first end for access to a second axial cavity extending from the second opening to inside the main body;
a first clamp comprising a first main rail with a substantially elongate profile slidably coupled in said first axial cavity through said first opening, said first main rail comprising a substantially rectangular cut-out running axially along the first main rail;
a second clamp comprising a second main rail with a substantially elongate profile slidably coupled in said second axial cavity through said second opening, said second main rail comprising a substantially rectangular cut-out running axially along the second main rail, wherein the second clamp comprises a mounting platform with a horizontal rail coupled to the second main rail, wherein the horizontal rail includes a pair of elongate cut-outs equally spaced from a midpoint of the horizontal rail and a pair of adjustable mounting arms selectively coupled to each of the pair of elongate cut-outs, wherein each of the pair of adjustable mounting arms includes a base having an elastomeric contact and an angled brace rising substantially vertical from the base;
a first port on a side of said main body for selectively applying compressive force to said first main rail thereby restricting movement of said first main rail;
a second port on a side of said main body for selectively applying compressive force to said second main rail thereby restricting movement of said second main rail; and
a channel on a bottom side of said main body for coupling an external mounting adapter.

7. The apparatus of claim 6, further comprising:
a first axially-mounted spring in said first axial cavity having a first coiled end engaged with a static anchoring point adjacent to the first opening, and a second coiled end engaged with the substantially rectangular first main rail cut-out, wherein the first axially-mounted spring imparts a force pulling said first main rail toward the midpoint of the main body.

8. The apparatus of claim 6, wherein the first clamp comprises a V-shaped element with an elastomeric contact surface.

9. The apparatus of claim 6, further comprising:
a second axially-mounted spring in said second axial cavity having a first coiled end engaged with a static anchoring point adjacent to the second opening, and a second coiled end engaged with the substantially rectangular second main rail cut-out, wherein the second axially-mounted spring imparts a force pulling said second main rail toward the midpoint of the main body.

10. The apparatus of claim 6, wherein said first and second ports are configured to retain a thumbscrew for applying said compressive force.

11. An apparatus for securely mounting a mobile device, comprising:
an elongate main body having a first end and an opposing second end, wherein the second end comprises an opening for access to an axial cavity extending from the opening to inside the elongate main body;
a first clamp coupled to the first end of the elongate main body;
a second clamp comprising a main rail with a substantially elongate profile slidably coupled in said axial cavity through said opening on said second end, said main rail comprising a substantially rectangular cut-out running axially along the main rail, wherein the second clamp comprises a mounting platform with a horizontal rail coupled to the main rail, wherein the horizontal rail includes a pair of elongate cut-outs equally spaced from a midpoint of the horizontal rail, and a pair of adjustable mounting arms selectively coupled to each of the pair of elongate cut-outs, wherein each of the pair of adjustable mounting arms includes a base having an elastomeric contact and an angled brace rising substantially vertical from the base;
a port on a side of said elongate main body for selectively applying compressive force to said main rail thereby restricting movement of said main rail; and
a channel on a bottom side of said elongate main body for coupling an external mounting adapter.

12. The apparatus of claim 11, further comprising:
an axially-mounted spring in said axial cavity having a first coiled end engaged with a static anchoring point adjacent to the opening, and a second coiled end engaged with the substantially rectangular rail cut-out, wherein the axially-mounted spring imparts a force pulling said main rail toward the first end of elongate main body.

13. The apparatus of claim 11, wherein said port is configured to retain a thumbscrew for applying said compressive force.

14. An apparatus for securely mounting a mobile device, comprising:
an elongate main body having a first end with one or more first openings for access to a first axial cavity extending from the one or more first openings to a midpoint of the elongate main body, and one or more second openings at an opposing end of the first end for access to a second axial cavity extending from the one or more second openings to the midpoint of the elongate main body;
a first clamp comprising a first main rail with a substantially elongate profile slidably coupled in said first axial cavity through said one or more first openings, said first main rail comprising a substantially rectangular cut-out running axially along the first main rail, wherein the first clamp comprises a first mounting platform with a first horizontal rail coupled to the first main rail, wherein the first horizontal rail includes a pair of elongate cut-outs equally spaced from a midpoint of the first horizontal rail, and a pair of adjustable mounting arms selectively coupled to each of the pair of elongate cut-outs, wherein each of the pair of adjustable mounting arms includes a base having an elastomeric contact and an angled brace rising substantially vertical from the base;

a second clamp comprising a second main rail with a substantially elongate profile slidably coupled in said second axial cavity through said one or more second openings, said second main rail comprising a substantially rectangular cut-out running axially along the second main rail;

a first port on a side of said elongate main body for selectively applying compressive force to said first main rail thereby restricting movement of said first main rail;

a second port on a side of said elongate main body for selectively applying compressive force to said second main rail thereby restricting movement of said second main rail; and a channel on a bottom side of said elongate main body for coupling an external mounting adapter.

15. The apparatus of claim 14, further comprising:
a first axially-mounted spring in said first axial cavity having a first coiled end engaged with a static anchoring point adjacent to the one or more first openings, and a second coiled end engaged with the substantially rectangular first main rail cut-out, wherein the first axially-mounted spring imparts a force pulling said first main rail toward the midpoint of the elongate main body.

16. The apparatus of claim 14, wherein the second clamp comprises a second mounting platform with a second horizontal rail coupled to the main rail, wherein the second horizontal rail includes a pair of elongate cut-outs equally spaced from a midpoint of the second horizontal rail, and a pair of adjustable mounting arms selectively coupled to each of the pair of elongate cut-outs, wherein each of the pair of adjustable mounting arms includes a base having an elastomeric contact and an angled brace rising substantially vertical from the base.

17. The apparatus of claim 14, further comprising:
a second axially-mounted spring in said second axial cavity having a first coiled end engaged with a static anchoring point adjacent to the one or more second openings, and a second coiled end engaged with the substantially rectangular second main rail cut-out, wherein the second axially-mounted spring imparts a force pulling said second main rail toward the midpoint of the elongate main body.

18. An apparatus for securely mounting a mobile device, comprising:

a main body having a first end with a first opening for access to a first axial cavity extending from the first opening to inside the main body, and a second opening at the opposing end of the first end for access to a second axial cavity extending from the second opening to inside the main body;

a first clamp comprising a first main rail with a substantially elongate profile slidably coupled in said first axial cavity through said first opening, said first main rail comprising a substantially rectangular cut-out running axially along the first main rail, wherein the first clamp comprises a first mounting platform with a first horizontal rail coupled to the first main rail, wherein the first horizontal rail includes a pair of elongate cut-outs equally spaced from a midpoint of the first horizontal rail, and a pair of adjustable mounting arms selectively coupled to each of the pair of elongate cut-outs, wherein each of the pair of adjustable mounting arms includes a base having an elastomeric contact and an angled brace rising substantially vertical from the base;

a second clamp comprising a second main rail with a substantially elongate profile slidably coupled in said second axial cavity through said second opening, said second main rail comprising a substantially rectangular cut-out running axially along the second main rail;

a first port on a side of said main body for selectively applying compressive force to said first main rail thereby restricting movement of said first main rail;

a second port on a side of said main body for selectively applying compressive force to said second main rail thereby restricting movement of said second main rail; and a channel on a bottom side of said main body for coupling an external mounting adapter.

19. The apparatus of claim 18, further comprising:
a first axially-mounted spring in said first axial cavity having a first coiled end engaged with a static anchoring point adjacent to the one or more first openings, and a second coiled end engaged with the substantially rectangular first main rail cut-out, wherein the first axially-mounted spring imparts a force pulling said first main rail toward the midpoint of the elongate main body.

20. The apparatus of claim 18, wherein the second clamp comprises a second mounting platform with a second horizontal rail coupled to the main rail, wherein the second horizontal rail includes a pair of elongate cut-outs equally spaced from a midpoint of the second horizontal rail, and a pair of adjustable mounting arms selectively coupled to each of the pair of elongate cut-outs, wherein each of the pair of adjustable mounting arms includes a base having an elastomeric contact and an angled brace rising substantially vertical from the base.

* * * * *